(12) United States Patent
Polak et al.

(10) Patent No.: US 10,181,083 B2
(45) Date of Patent: Jan. 15, 2019

(54) SCENE CHANGE DETECTION AND LOGGING

(71) Applicant: Viisights Solutions Ltd., Tel-Aviv (IL)

(72) Inventors: Simon Polak, Tel-Aviv (IL); Menashe Rothschild, Tel-Aviv (IL); Asaf Birenzvieg, Hod-HaSharon (IL)

(73) Assignee: Viisights Solutions Ltd., Tel-Aviv (IL)

( * ) Notice: Subject to any disclaimer, the term of this patent is extended or adjusted under 35 U.S.C. 154(b) by 103 days.

(21) Appl. No.: 15/421,455

(22) Filed: Feb. 1, 2017

(65) Prior Publication Data
US 2017/0270363 A1 Sep. 21, 2017

Related U.S. Application Data

(60) Provisional application No. 62/310,885, filed on Mar. 21, 2016.

(51) Int. Cl.
*G06K 9/00* (2006.01)
(52) U.S. Cl.
CPC ................. *G06K 9/00765* (2013.01)
(58) Field of Classification Search
CPC .......... G06K 9/00765; G06K 9/00718; G06K 9/00758; G06K 9/52; G06K 9/6256
See application file for complete search history.

(56) References Cited

U.S. PATENT DOCUMENTS

| | | | | |
|---|---|---|---|---|
| 2008/0186413 | A1* | 8/2008 | Someya | H04N 5/20 348/739 |
| 2012/0321273 | A1* | 12/2012 | Messmer | G11B 27/031 386/224 |

OTHER PUBLICATIONS

Shalev-Shwartz et al. "On the Sample Complexity of End-to-End Training Vs. Semantic Abstraction Training", ArXiv Preprint ArXiv: 1604.06915-1-1604.06915-4, Apr. 23, 2016.
Brandt et al. "Fast Frame-Based Scene Change Detection in the Compressed Domain for MPEG-4 Video", The Second International Conference on Next Generation Mobile Applications, Services and Technologies, 2008, NGMAST '08, Cardiff, GB, Sep. 16-19, 2008, p. 514-520, Sep. 2008.
Chen et al. "Video Scene Change Detection Method Using Unsupervised Segmentation and Object Tracking", IEEE International Conference on Multimedia and Expo, ICME 2001, Tokyo, Japan, Aug. 22-25, 2001, p. 56-59, Aug. 2001.
Jiang et al. "Scene Change Detection for Video Database Management Systems—A Survey", Department of Computer Sceince, Purdue University, Purdue e-Pubs, Computer Science Technical Reports, Report No. 96-058, p. 1-28, Oct. 1996.

* cited by examiner

*Primary Examiner* — Tom Y Lu

(57) ABSTRACT

A computer implemented method of detecting scene changes in a stream of frames by analyzing content differences between consecutive frames, comprising:
(a) Identifying a content of each of a plurality of frames of a frames stream by applying a plurality of visual classification functions to each frame. The content comprises one or more of a plurality of visual elements.
(b) Determining a content difference between every two consecutive frames of the plurality of frames by comparing the content of the two consecutive frames.
(c) Detecting a scene change between the two consecutive frames when the content difference exceeds a pre-defined threshold. The scene change defines a separation between consecutive scenes of a plurality of scenes in the frames stream wherein each of the scenes comprises a subset of the plurality of frames.

17 Claims, 9 Drawing Sheets

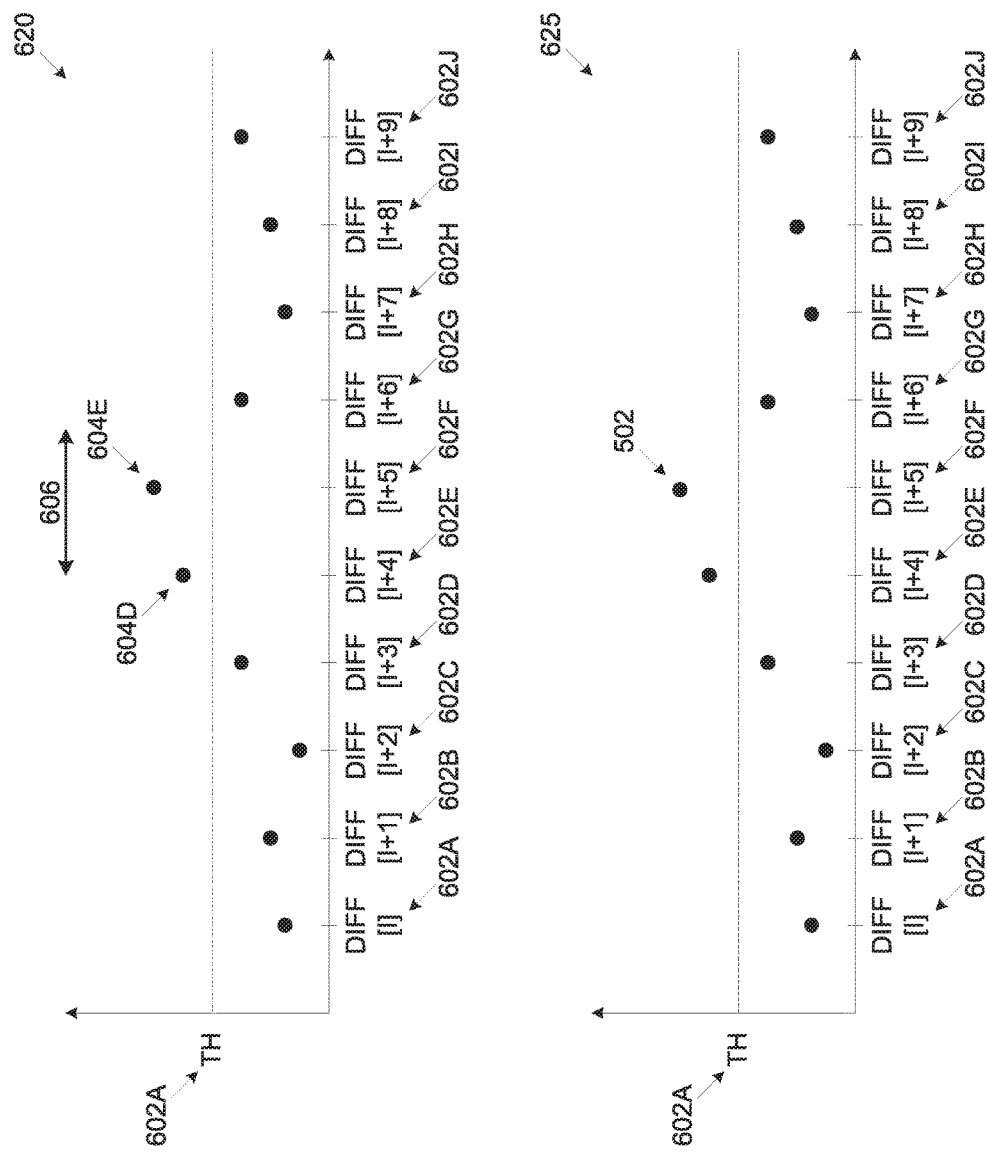

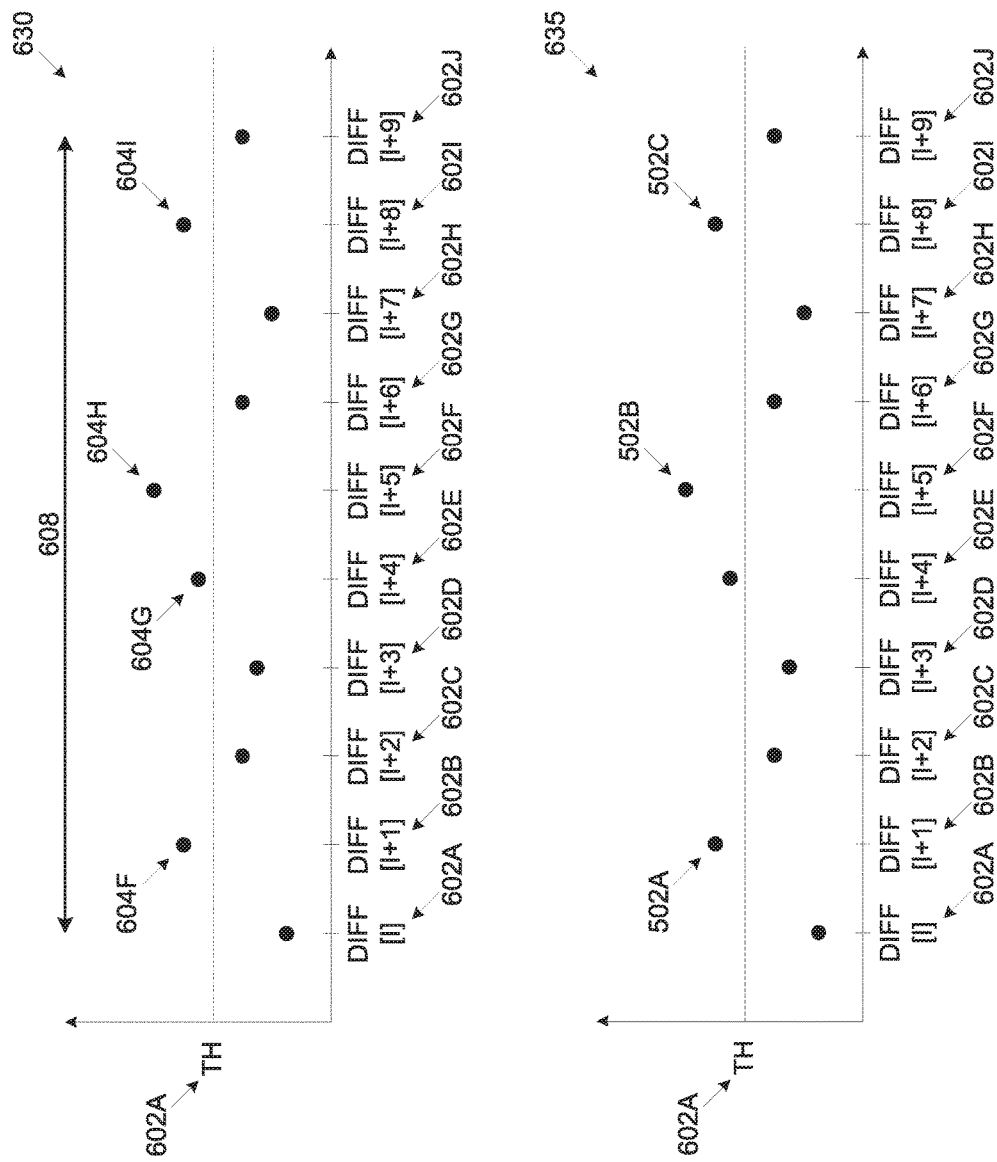

SCENE CHANGE DETECTION AND LOGGING

RELATED APPLICATION

This application claims benefit of priority under 35 USC 119(e) of U.S. Provisional Patent Application No. 62/310,885 filed on Mar. 21, 2016, the contents of which are incorporated herein by reference in their entirety.

FIELD AND BACKGROUND OF THE INVENTION

The present invention, in some embodiments thereof, relates to detecting scene changes in a stream of frames, and, more specifically, but not exclusively, to detecting scene changes in a stream of frames by analyzing content differences between consecutive frames.

Efficient content organization of digital media in general and of video data in particular may be an essential key for allowing a plurality of application, such as for example, media management, media streaming and/or advertisement to take full advantage of the organized video data.

It may be highly desirable to organize the video data, for example, video stream(s), video file(s) and/or video database(s) on scene basis since the scenes which consist of sequences of frames (images) are building blocks of the video data. Identifying and/or segmenting the video data into scenes may present major benefits, for example, scene based advertisement segmentation and/or focus, scene based streaming and/or scene based storage.

SUMMARY OF THE INVENTION

According to some embodiments of the present invention, there is provided a computer implemented method of detecting scene changes in a stream of frames by analyzing content differences between consecutive frames, comprising:

Identifying a content of each of a plurality of frames of a frames stream by applying a plurality of visual classification functions to each frame. The content comprises one or more of a plurality of visual elements.

Determining a content difference between every two consecutive frames of the plurality of frames by comparing the content of the two consecutive frames.

Detecting a scene change between the two consecutive frames when the content difference exceeds a pre-defined threshold. The scene change defines a separation between consecutive scenes of a plurality of scenes in the frames stream wherein each of the plurality of scenes comprises a subset of the plurality of frames.

Each of the plurality of visual classification functions is a trained classification functions which is trained offline to classify the respective visual element.

Each of the plurality of visual classification functions is a member selected from a group consisting of: a single label visual classification function and a multi-label visual classification function.

Optionally, a semantic image descriptor (SID) is generated for each of the plurality of frames to express the content of each frame. The SID is a vector comprising a plurality of visual element probability scores which are each assigned with a probability value of a respective one of the plurality of visual elements. Each of the plurality of visual element probability scores is calculated by an associated one of the plurality of visual classification functions to indicate a probability of existence of the respective visual element in each frame.

Optionally, a scene change is detected by calculating the content difference through comparison of respective visual element probability values in the SID of the two consecutive frames of the plurality of frames and designating the scene change between the two consecutive frames when a result of the comparison exceeds the pre-defined threshold.

Optionally, the pre-defined threshold is optimized during offline training to increase positive detection and/or reduce false detection of the scene change in the frames stream.

Optionally, the pre-defined threshold is optimized according to a content of the frames stream.

Optionally, the scene change is selected from two or more candidate scene changes identified among three or more consecutive frames of the plurality of frames. The content difference for each of the two or more candidate scene changes exceeds the pre-defined threshold. The scene change is selected by identifying a selected candidate scene change having a largest content difference among the at two or more candidate scene changes.

Optionally, the scene change is selected from two or more candidate scene changes identified within a pre-define time interval. The content difference calculated for each of the two or more exceeds the pre-defined threshold. The scene change is selected by identifying a selected candidate scene change having a largest content difference among the two or more candidate scene changes.

Optionally, two or more scene changes are from three or more candidate scene changes identified within an extended pre-define time interval when a number of the candidate scene changes exceeds a pre-defined number of allowed scene changes within the extended pre-define time interval. The content difference calculated for each of the three or more candidate scene changes exceeds the pre-defined threshold. The two or more scene changes are selected by identifying two or more selected scene change having a largest content difference among the three or more candidate scene changes.

Optionally, one or more macro-scenes are created by grouping together three or more scenes of the plurality of scenes by:

Calculating the content difference between a last frame of an earlier scene among two non-consecutive scenes of the three or more scenes and a first frame of a later scene among the two non-consecutive scenes.

Grouping together the two non-consecutive scenes and one or more middle scenes detected in between the earlier scene and the later scene in case the calculated content difference is lower than the pre-defined threshold.

Optionally, the plurality of frames are selected frames which are extracted from the frames stream.

Optionally, scene information is embedded in a metadata associated with the frames stream. The scene information is derived from the scene change.

According to some embodiments of the present invention, there is provided a system for detecting scene changes in a stream of frames by analyzing contents differences between consecutive frames. The system comprises an interface module for receiving a frames stream comprising a plurality of frames, a program store storing a code and one or more processor coupled to the interface and the program store for executing the stored code. The code comprising:

Code instructions to identify a content of each of the plurality of frames by applying a plurality of visual classification functions to each frame. The content comprises one or more of a plurality of visual elements.

Code instructions to determine a content difference between every two consecutive frames of the plurality of frames by comparing the content of the two consecutive frames.

Code instructions to detect a scene change between the two consecutive frames when the content difference exceeds a pre-defined threshold. The scene change defines a separation between consecutive scenes of a plurality of scenes in the frames stream wherein each of the plurality of scenes comprises a subset of the plurality of frames.

Optionally, the code comprises code instructions to embed scene information in a metadata associated with the frames stream. The scene information is derived from the scene change.

Optionally, the code comprises code instruction to extract selected frames from the frames stream. The selected frames constitute the plurality of frames used for detecting the scene change.

Optionally, the code comprises code instructions to create one or more macro-scene. The one or more macro-scenes are created by grouping together three or more scenes of the plurality of scenes by:

Calculating the content difference between a last frame of an earlier scene among two non-consecutive scenes of the three or more scenes and a first frame of a later scene among the two non-consecutive scenes.

Grouping together the two non-consecutive scenes and one or more middle scenes detected in between the earlier scene and the later scene in case the calculated content difference is lower than the pre-defined threshold.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6B is a schematic illustration of an exemplary heuristic process for detecting a scene change among a plurality of candidate scene changes which occur within a pre-defined time interval, according to some embodiments of the present invention;

FIG. 6C is a schematic illustration of an exemplary heuristic process for detecting a scene change among a plurality of candidate scene changes which occur within a pre-defined number of frames, according to some embodiments of the present invention.

DESCRIPTION OF SPECIFIC EMBODIMENTS OF THE INVENTION

Figure 1:
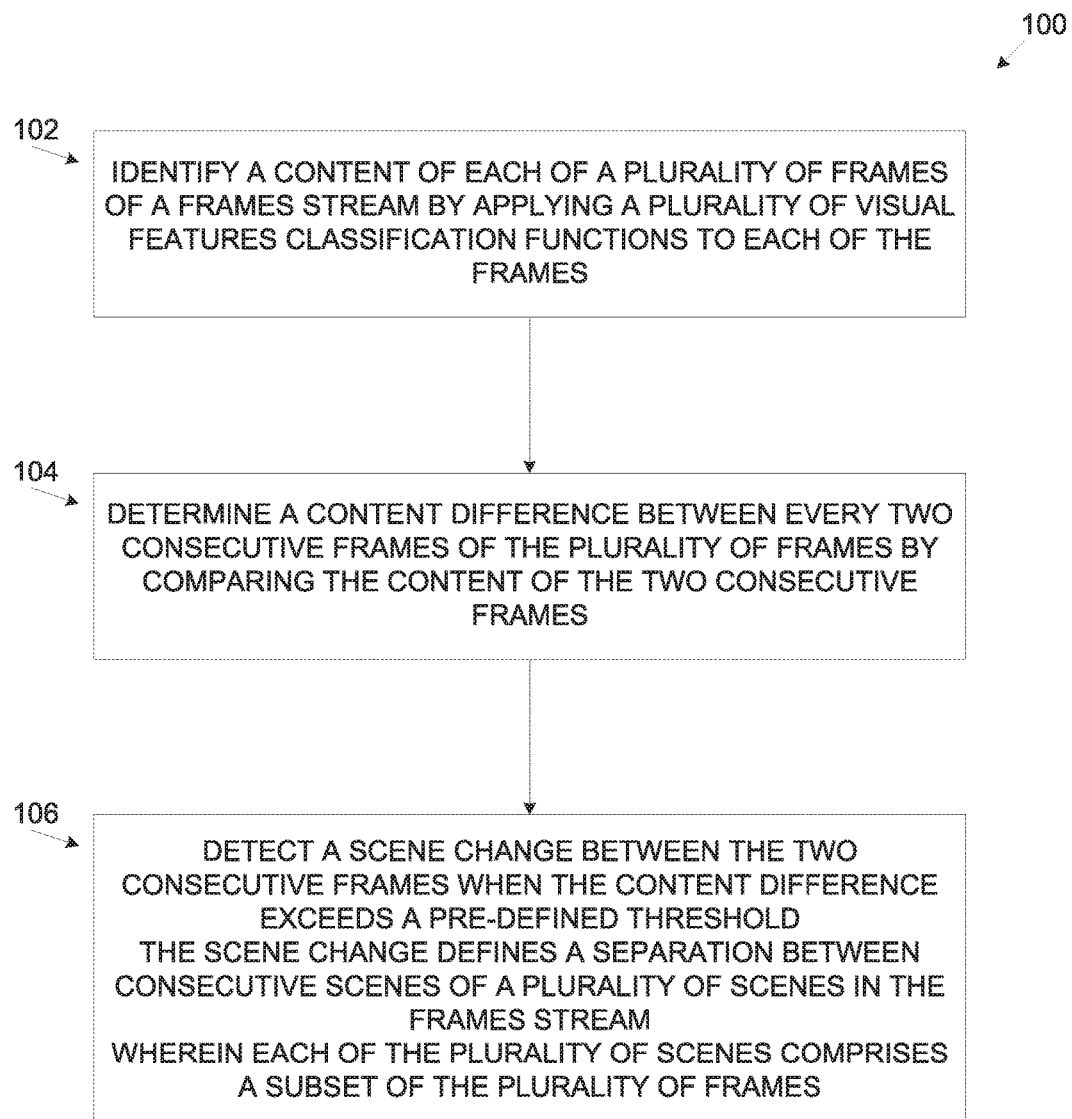
FIG. 1 is a flowchart of an exemplary process for detecting scene change(s) in a frames stream, according to some embodiments of the present invention.

The present invention, in some embodiments thereof, relates to detecting scene changes in a stream of frames, and, more specifically, but not exclusively, to detecting scene changes in a stream of frames by analyzing content differences between consecutive frames.

According to some embodiments of the present invention, there are provided methods and systems for detecting scene changes in a stream of frames (images) by analyzing content differences between consecutive frames in order to arrange and/or segment the stream of frames to scenes which consist of a sequence of frames of the frames stream. Efficiently detecting the scene changes may be a crucial step in segmenting the frames stream to a plurality of scenes each comprising a subset of frames of the frames stream which are presenting substantially the same content. The frames stream, for example, a video stream, an H.264 stream, a moving picture experts group (MPEG) stream, a motion joint photographic experts group (JPEG) stream and/or a stream of still images may take one or more forms, for example, a stream, a file and/or a database. Detection of the scene change starts by identifying a content of each of the frames in the frames stream and comparing the content difference between consecutive frames in the frames stream.

The content of each of the frames may be identified by applying a plurality of visual classification functions which are trained offline to detect in a given frame one or more visual elements, for example, an entity, an object, a logo, a symbol, a face, a location, a scenery, a landscape and the likes. The visual classification functions may be implemented by one or more learning algorithms such as, support vector machine(s) (SVM), neural network(s), convolutional neural network(s) (CNN), decision tree(s) and the likes.

The content of every two consecutive frames of the frames stream is compared to identify a content difference between the consecutive frames. In case the content difference between two consecutive frames of the frames stream exceeds a pre-defined threshold value a scene change is detected and designated between the respective consecutive frames. The pre-defined threshold value is determined during the offline training using the visual classification functions. The pre-defined threshold value may be selected to optimize the detection of the scene changes such that the probability for detecting scene changes which represent real (actual) scene changes is maximized while the probability for detecting scene changes which do not represent real (actual) scene changes is minimized. The training may include manual scene change designation to identify optimal settings for the pre-defined threshold value. The process may be repeated throughout the frames stream to detect additional scene change(s) in order to segment the entire frames stream. The scene change information is then logged to make it available for one or more application which may take advantage of the segmented frames stream which is segmented with two or more scenes.

The scene information, for example, scene change markers and/or scenes' boundaries may be encoded within a metadata record of the frames stream and/or of one or more of the plurality of frames. The scene information may be treated as additional information integrated in the metadata record in case such metadata record is already available for the frames stream and/or the frames. Optionally, the scene information may be treated as new metadata record(s) attached to the frames stream and/or the frames.

The visual classification functions may generate a content record for each of the frames. The content record is referred to hereinafter as a semantic image descriptor (SID) record, for example, a vector, a list and/or an array. The SID record comprises a plurality of visual elements probabilistic values which are each indicative of a probability of an associated visual element being presented in a respective frame. The content difference between frames may be calculated by comparing the SID records of consecutive frames in the frames stream and detect the scene change in case the value resulting from the comparison exceeds the pre-defined threshold value.

Moreover, three or more scenes which are detected in the frames stream may be grouped together to create a macro-scene. The macro-scene may include two or more substantially similar non-consecutive scenes which present substantially the same content together with one or more scenes detected in between the substantially similar non-consecutive scenes. The substantially similar content presented in the substantially similar non-consecutive scenes may be considered similar even if the content is transformed through, for example, zoom effect(s), varying viewing angle(s), illumination level, image distortion(s) and the likes.

Detecting scene changes by analyzing and comparing content of consecutive frames may present significant advantages compared to currently existing frame stream segmentation methods. The currently existing frame stream segmentation methods may detect scene changes by exploring internal homogeneity of a scene in order to detect visual effects changes between consecutive frames by comparing, for example, color histogram(s), brightness level(s) and/or gradients in the frames. While the existing methods may be highly susceptible to changes in one or more of a plurality of conditions, for example, viewing angle, zoom level and/or lighting conditions, detecting the scene changes by identifying and comparing the content of consecutive frames may be highly immune to such condition(s) changes thus providing a robust segmentation process of the frames stream.

Furthermore, identifying one or more macro-scenes may provide additional value with respect to intelligently and/or efficiently segmenting the frames stream. In many scenarios, especially with today's advanced broadcasting practices the frames stream may depict a single event which may be captured, for example, from different viewing points. Such a scenario may be considered by the currently existing methods as scenes presenting completely different events and/or content. However when using the content of the frames to detect the scenes' boundaries, it is possible to comprehend the context of the scenes to create the macro-scene(s) which may include scenes that are closely related and may thus be regarded as a single scene.

Optionally, the frames which are processed to detect the scene change(s) are selected frames which are extracted from the frames stream. For example, intra frames (I-Frames also known as IF) may be extracted from the frames stream which may be a compressed video stream such as, for example, MPEG-2 and/or H.264. The scene change detection process may be applied only to the I-Frames while predicted frames (P-Frames) and/or bidirectional frames (B-Frames) which are also available in the compressed video stream are not used. The I-Frames are independent of other frames in the compressed video stream and contain complete visual data of the frame. Processing only the selected frames may significantly reduce the processing resources and/or processing time required for detecting the scene change(s) in the compressed video stream.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a flowchart of an exemplary process for detecting scene change(s) in a frames stream, according to some embodiments of the present invention. A process 100 is executed for detecting one or more scene changes in a frames stream.

Figure 2:
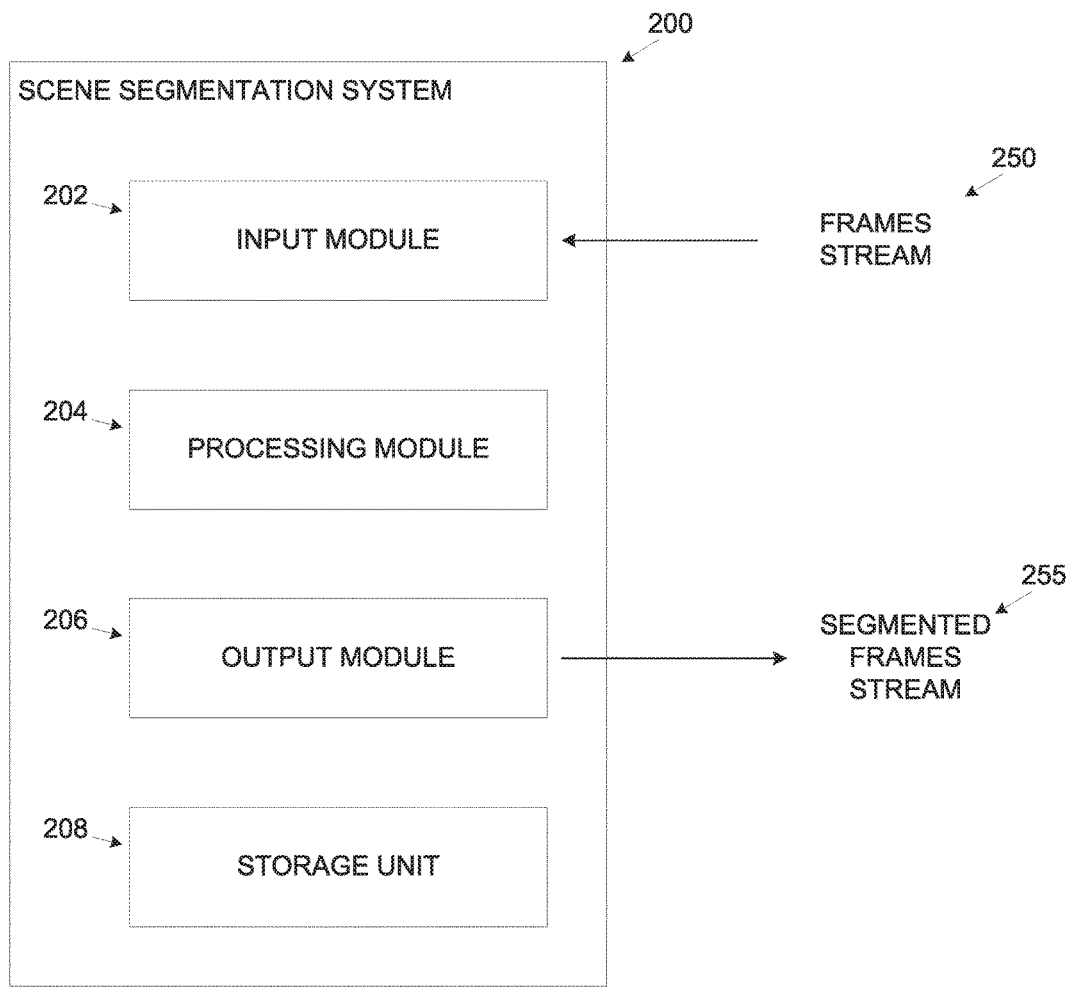
FIG. 2 is a schematic illustration of an exemplary system for detecting scene change(s) in a frames stream, according to some embodiments of the present invention.

Reference is also made to FIG. 2 which is a schematic illustration of an exemplary system for detecting scene change(s) in a frames stream, according to some embodiments of the present invention. A system 200 includes an input module 202 for receiving a frames stream 250, a processing module 204 for segmenting the frames stream 250 by detecting scene changes in the frames stream 250, an output module 206 for outputting a segmented frames stream 255 and a storage unit 208 for storing code and/or visual classification functions for processing frames of the frames stream 250. Wherein a module refers to a plurality of program instructions stored in a non-transitory medium such as the storage unit 208 and executed by one or more processors and/or one or more cores of one or more processors. The storage unit 208 may include one or more storage non-transitory medium devices, for example, a hard drive, a solid state drive, a non-volatile memory device, a remote storage device, a remote server and the likes. The system 200 may further include one or more communication interfaces for communicating with one or more remote device, for example, the remote storage device, the remote server, a network processing node, an internet processing node and the likes. The frames stream 250, for example, a video stream, an H.264 stream, an MPEG stream, a motion JPEG stream and/or a stream of still images which may be received by the system 200 through the input module 202 may be available in one or more forms, for example, a stream, a file and/or a database.

As shown at 102, the process 100 starts identifying a content of each of the frames of the frames stream 250 received and/or designated by an input module such as the input module 202. The content of each of the frames may be identified by a processing module such as the processing module 204 by applying a plurality of visual classification functions which may be retrieved from a storage medium such as the storage unit 208. The content of each frame may be described by an SID record (content record), for example, for example, a vector, a list and/or an array.

Optionally, the frames which are processed to identify their content are selected frames which are extracted from the frames stream 250. For example, I-Frames (IF) may be extracted from the frames stream 250 in case the frames stream 250 is a compressed video stream such as, for example, MPEG-2 and/or H.264. This may be useful to avoid processing P-Frames and/or B-Frames of the compressed frames stream 250 which may be partial and/o dependent on the I-Frames and may therefore be less effective for the scene change(s) detection.

The visual classification functions may employ one or more learning probabilistic models, for example, SVM functions, neural networks, CNN(s), decision tree(s) and the likes. The visual classification functions may be trained offline to statistically estimate presence of one or more visual elements, for example, an entity, an object, a logo, a symbol, a face, a location, scenery, a landscape and the likes in the processed frame. The visual classification functions may be trained with a set of training data samples, for example, images, frames, partial images and the likes which are each associated with one or more classification labels each representing one or more of the visual elements. Training the visual classification functions aims to allow the visual classification functions to learn the pattern of the respective visual element(s). The training data set may be selected to include a large number of samples which portray various aspects of the visual elements, for example, multiple different items of the visual element(s), multiple viewing angles of the visual element(s), transformations (rotation, shift, translation, scaling, reflection, etc.) of the visual elements and the likes. The large training data set may serve to improve the estimation capabilities of the visual classification function and/or for reducing possible overfitting effects. Training the visual classification functions with the various aspects (variety and/or transformations) of the visual element(s) may allow properly classifying the visual element(s) even when the visual element(s) are somewhat transformed, for example, rotated shifted, scaled zoomed in/out and the likes.

The visual classification functions may be single class classification functions trained to estimate a single label (associated with a respective visual element) and/or multi-class classification functions trained to estimate multiple labels (associated with multiple visual elements). The single class visual classification functions may be trained with training data samples having binary classification labels identifying a presence or absence of the respective visual element, for example, "a car" and "not a car". The multi-class visual classification functions on the other hand may be trained with training data samples having multiple classification labels identifying a presence or absence of the respective visual element (s), for example, a car, a motorcycle, a horse and/or a television set (TV). In addition one or more of the visual elements, for example, a car and a truck may be associated with a single classification label, for example, a car. Moreover, the visual element(s), for example, a motorcycle identified in the processed frame may be associated with two or more classification labels, for example, a vehicle and a motorcycle. The visual element(s) may be identified in the natural form as reflected in the frame(s) or after some pre-processing, for example, feature extraction such as, for example, a histogram of oriented gradients (HOG) feature(s).

The training process may be regarded as an optimization process in which parameters of the visual classification functions are tuned such as to reduce the estimation and/or prediction error for the estimation of the presence of the visual elements presented in the training data samples. After training, the visual classification functions are capable of receiving real samples such as frames and/or images in a similar format to the training data samples and calculate a probability score (value) for one or more classification labels associated with respective visual element(s). In other words, the visual classification functions are capable of calculating a probability score for a presence of the respective visual element(s) in the real samples based on the classification label(s). The calculated probability score may be in the form of a probability value, for example, in a range of 0 to 1 and/or the calculated probability score may be transformed to a probability, for example, through a Platt scaling process.

Figure 3:
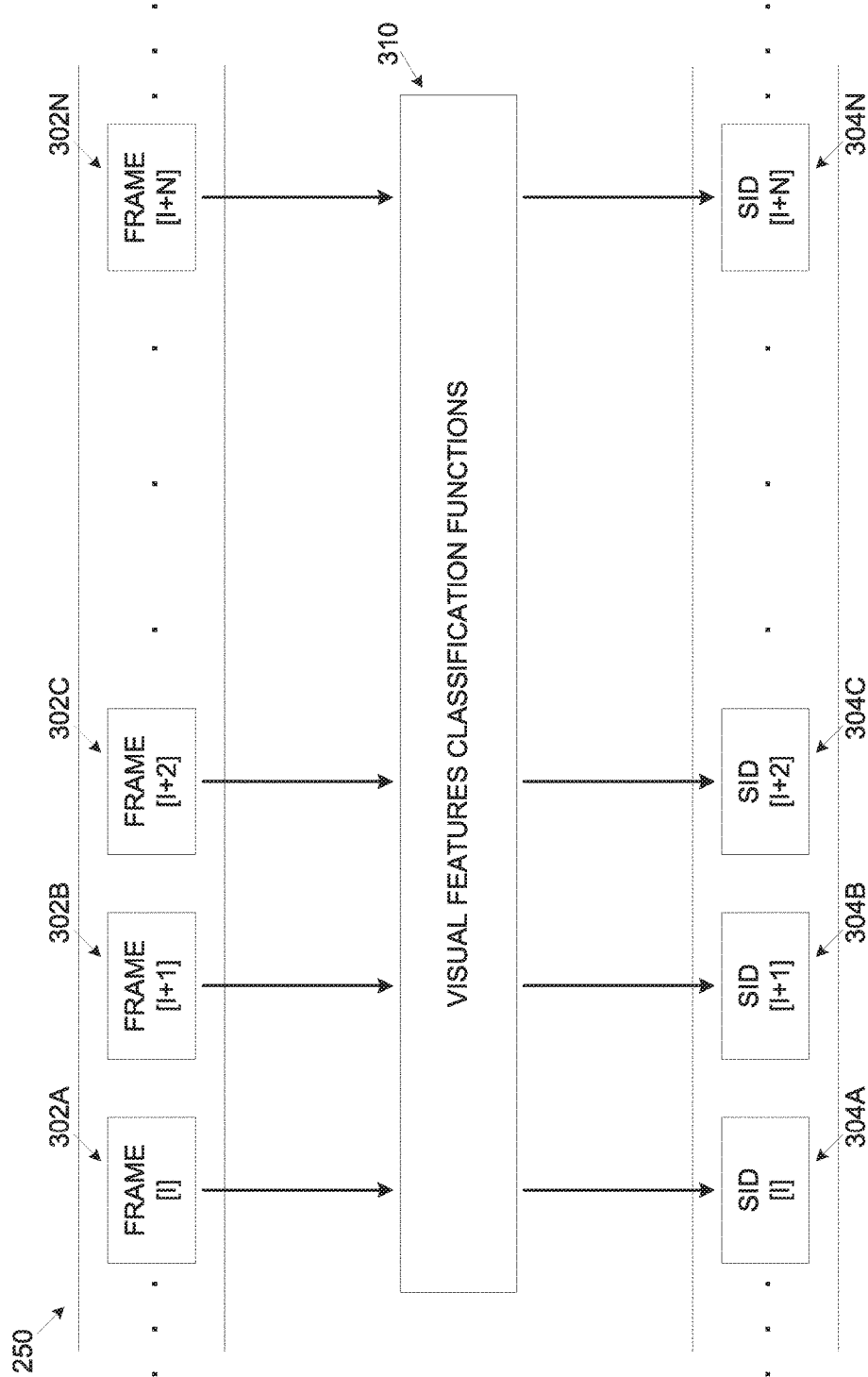
FIG. 3 is a schematic illustration of an exemplary process for identifying content of frames using visual classification functions, according to some embodiments of the present invention.

Reference is now made to FIG. 3 which is a schematic illustration of an exemplary process for identifying content of frames using visual classification functions, according to some embodiments of the present invention. One or more visual classification functions 310 may be applied to each of a plurality of frames 302 of a frames stream such as the frames stream 250 to estimate the content of each of the frames 302 to create a respective SID record (content record) 304. For example, the result of the classification process of the visual classification functions 310 applied to a FRAME [i] 302A is an SID[i] 304A. Similarly, an SID[i+1] 304B, an SID[i+2] 304C is generated for each of the respective frames, FRAME[i+1] 302B and FRAME[i+2] 302C and so on for all frames in the frames stream 250.

In a preferred embodiment of the present invention the SID record 304 is a vector comprising a plurality of probability scores each indicating an estimated probability of existence of a respective visual element in the processed frame. Each of the probability scores is generated by a respective one or more of the visual classification functions.

Figure 4:
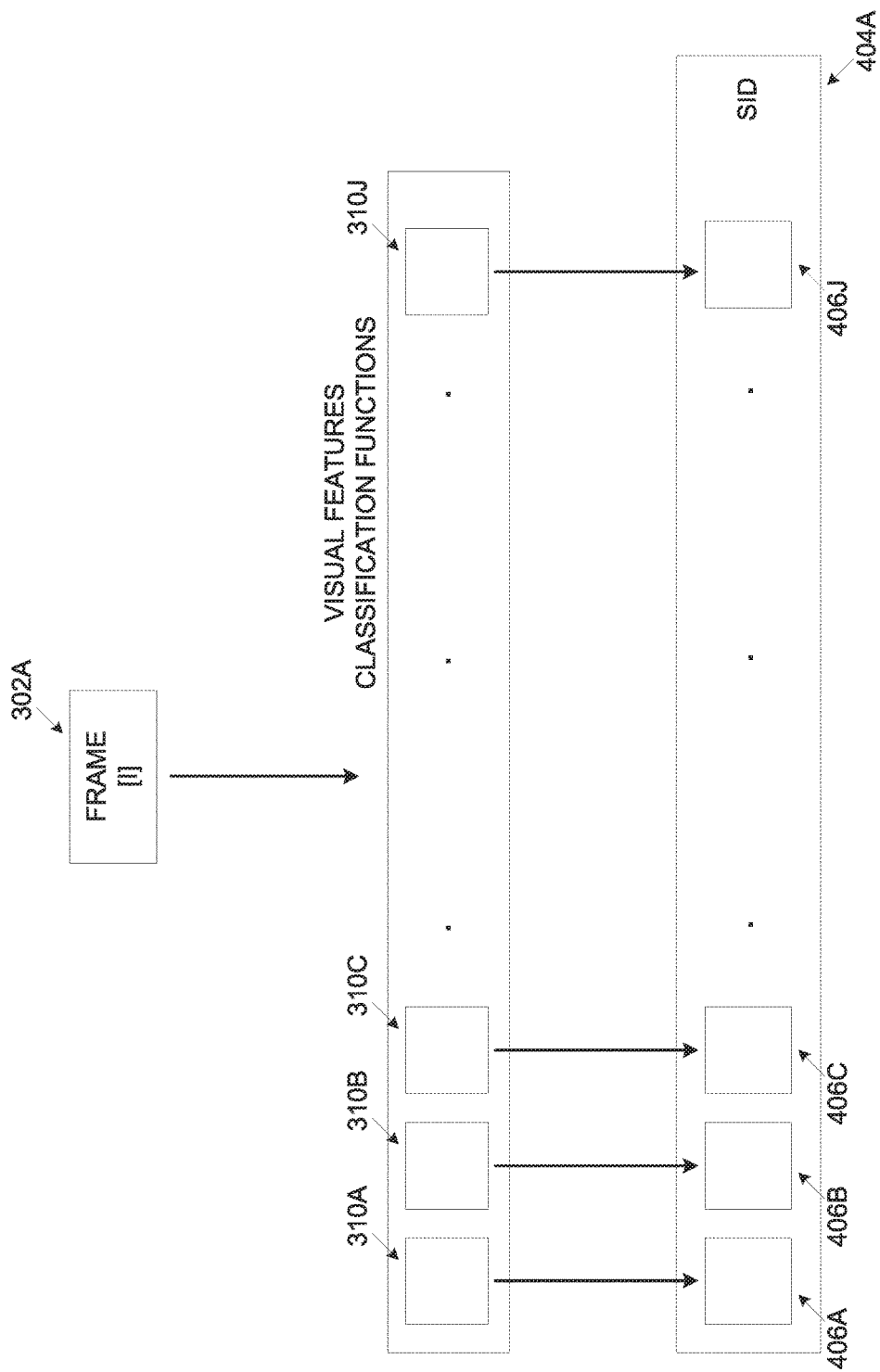
FIG. 4 is a schematic illustration of a preferred embodiment process for creating a semantic image descriptor (SID) vector to describe a content of a frame, according to some embodiments of the present invention.

Reference is now made to FIG. 4 which is a schematic illustration of a preferred embodiment process for creating an SID vector to describe a content of a frame, according to some embodiments of the present invention. An exemplary frame such as the frame FRAME[I] 302A is applied with one or more of a plurality of visual classification functions such as the visual classification functions 310 to create an SID vector 404A which may be an expression of the SID record 304A. The visual classification functions 310 may include a plurality of classification functions 310A-310J which may each be single class and/or multi-class classification functions. Each of the visual classification functions 310 is trained (offline) to identify existence of one or more visual elements in the FRAME[I] 302A and calculates a probability score 406 which indicates the probability of existence of the respective visual element in the FRAME[I] 302A. For example, a visual classification function 310A generates a probability score which expresses the probability of existence of the visual element classified by the visual classification function 310A. Similarly, additional one or more visual classification function 310B, 310C through 310J each generates a probability score 406B, 406C through 406J respectively to indicate the probability of existence of the visual element calculated by the respective visual classification function 310B, 310C through 310J. The plurality of probability scores 406 constitute the SID vector 404A. The same process may be applied to processing additional frames 302 in the frames stream 250 to create a respective SID vector 404 for each of the frames 302.

Reference is made once again to FIG. 1. As shown at 104, the content of consecutive frames such as the frames 302 is compared to each other to generate a content difference between the consecutive frames 302. The content is compared by evaluating the visual element(s) presence probabilities in the consecutive frames 302 such as to quantify the common visual elements shared between the consecutive frames 302 versus the differentiating visual element(s) detected in only one of the consecutive frames 302.

As shown at 106, the content difference between the consecutive frames 302 is compared to a pre-defined threshold value (level). A scene change is detected in case the content difference exceeds the pre-defined threshold value since the two consecutive frames are estimated to contain different visual element(s) thus not depicting the same content. The pre-defined threshold value may be optimized during the offline training of the visual classification functions. The pre-defined threshold value may be optimized to maximize positive scene change detection while minimizing false scene change detection. Positive scene change detection refers to detecting scene changes which represent real (actual) scene changes in the frames stream 250. Negative scene change detection relates to detecting scene changes which do not represent real scene changes. Naturally, the optimization of the pre-defined threshold value aims to allow detection of real scene changes while avoiding detection of false scene changes and/or avoiding misdetection of real scene changes. The optimization of the pre-defined threshold value during the training may include manual scene change designation to identify optimal settings for the pre-defined threshold value. Furthermore the pre-defined threshold value may be selected from two or more pre-defined threshold values adapted for different frames streams 250 depict different contents, for example, sports events, music events, action movies, documentary movies and the likes.

The process 100 may be repeated throughout the frames stream 250 to create a segmented frames stream such as the segmented frames stream 255. The segmented frames stream 255 may be outputted through an output module such as the output module 206.

The scene information, for example, scene change(s) and/or scene boundaries may be logged in a list, a record and the likes and may be further used by one or more applications, for example, content management applications, advertisement applications and/or streaming applications. Optionally, the scene information may be embedded in a metadata record of the frames stream 250 and/or in a metadata record of one or more of the frames 302. Optionally, the scene information may be added as a new metadata record associated with the frames stream 250 and/or one or more of the frames 302.

Following the preferred embodiment presented hereinabove the content difference may be calculated and compared to the pre-defined threshold value by processing respective SID vectors such as the SID vectors 404.

Figure 5:
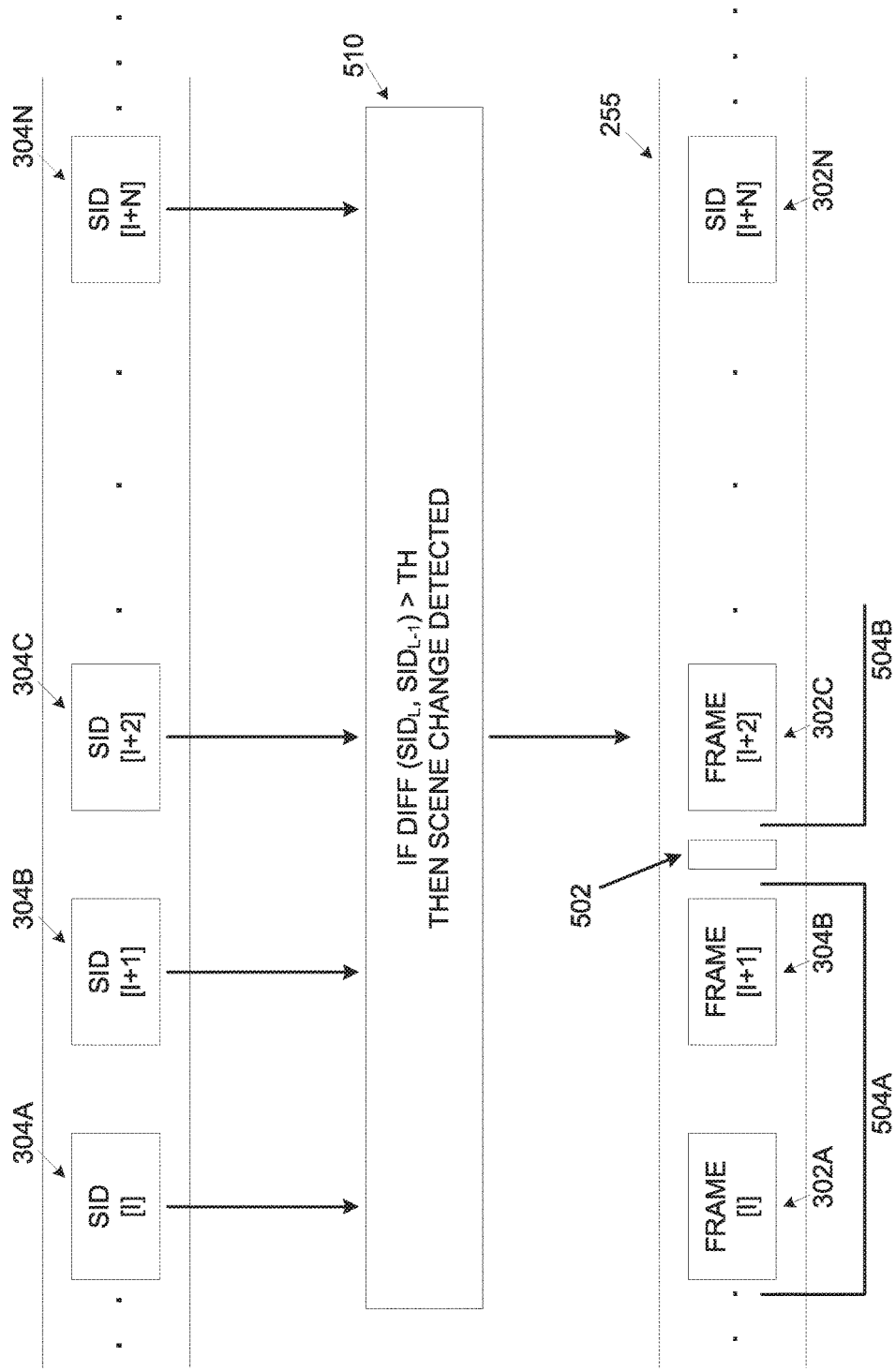
FIG. 5 is a schematic illustration of a preferred embodiment process for detecting scene change(s) by comparing a difference between SID vector of consecutive frames, according to some embodiments of the present invention.

Reference is now made to FIG. 5 which is a schematic illustration of a preferred embodiment process for detecting scene change(s) by comparing a difference between SID vectors of consecutive frames, according to some embodiments of the present invention. A plurality of SID records 304 each calculated for a respective frame of the plurality of frames 302 are analyzed to calculate a content difference, for example a distance between every pair of SID records 304 $SID_L$ and $SID_{L-1}$ of respective consecutive frames 302. The distance may be calculated by a distance function 510 which compares probability scores available from the SID records 304 of the consecutive frames 302 in order to identify a content difference (DIFF) and a possible scene change between the consecutive frames 302. the In the event the content difference (DIFF) exceeds the pre-defined threshold value (TH) the scene change is detected between the respective consecutive SID records 304 which in turn map to the respective consecutive frames 302. The pre-defined threshold value (TH) may be selected and/or optimized offline during training to define the pre-defined threshold value (TH) to maximize positive scene change detection while minimizing false scene change detection. For example, the content difference (DIFF) detected between an SID[I] 304A and an SID[I+1] 304B exceeds the pre-defined threshold value (TH) and a scene change 502 is detected between the respective frames FRAM[I] 302A and FRAME[I+1] 302B. The process is repeated for the rest of the SID records 304 of the frames 302 through the frames stream 250 to create the segmented frames stream 255.

The distance function 510 may include one or more distance functions, for example, Bhattacharya distance, KL divergence and the likes for comparing probability distributions of the probability scores 406 included in the SID vector 404 of pairs of consecutive frames 302.

Optionally, one or more heuristic functions are applied over the detected scene changes to handle one or more of a plurality of scenarios in which multiple rapid scene changes are detected within a relatively short time interval. Designating a scene which comprises very few frames 302 may not be effective and/or useful as it may not be grasped by the human eye and/or the scene change may not reflect an actual scene change. It may therefore be desirable to limit the scene segmentation to create an effective and/or useful segmented frames stream such as the frames stream 255 by limiting the number of scene changes detected within the relatively short time interval. Limiting the number of scene changes may be done by selecting one or more scene changes from two or more detected candidate scene changes. It should be emphasized that each of the candidate scene changes complies as a valid scene change since the content difference, for example the distance (DIFF) between the respective consecutive frames exceeds the pre-defined threshold value.

Figure 6A:
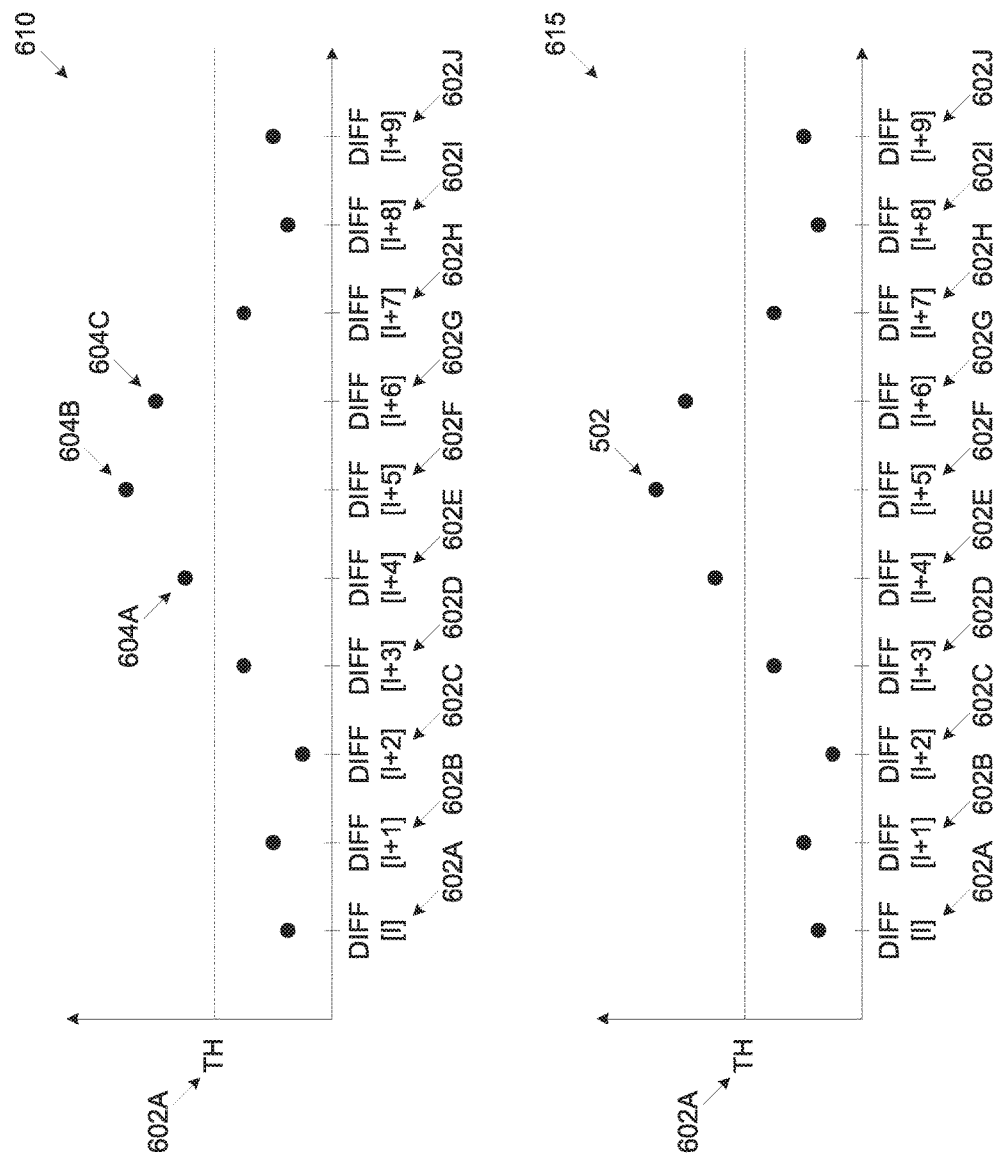
FIG. 6A is a schematic illustration of an exemplary heuristic process for detecting a scene change among a plurality of local candidate scene changes, according to some embodiments of the present invention.

Reference is now made to FIG. 6A which is a schematic illustration of an exemplary heuristic process for detecting a scene change among a plurality of local candidate scene changes, according to some embodiments of the present invention.

Reference is also made to FIG. 6B which is a schematic illustration of an exemplary heuristic process for detecting a scene change among a plurality of candidate scene changes which occur within a pre-defined time interval, according to some embodiments of the present invention.

Reference is also made to FIG. 6C which is a schematic illustration of an exemplary heuristic process for detecting a scene change among a plurality of candidate scene changes which occur within a pre-defined number of frames, according to some embodiments of the present invention.

Graphs 610, 615, 620, 625, 630 and 635 present a graphical representation of an exemplary distribution over time of a plurality of content differences (DIFF) calculated for a subset of consecutive frames such as the frame 302 of a frames stream such as the frames stream 250. The X axis of the graph 610 represents a time distribution of a plurality of content differences (DIFF) calculated, for example, by a distance function such as the distance function 510 for consecutive frames 302. The content differences (DIFF) are distributed along time according to the temporal location of their respective consecutive frames 302 within the frames stream 250. The Y axis represents a value of the content difference, i.e. the distance between SID vectors such as the SID vectors 404 of the respective consecutive frames 302. For example, the content differences DIFF[I] 602A corresponds to the content difference calculated for consecutive frames FRAME[I] and FRAME[I+1]. Similarly, content differences DIFF[I+1] 602B correspond to the content difference detected between consecutive frames FRAME[I+1] and FRAME[I+2] and so one for the other content differences (DIFF[i]). The pre-defined threshold (TH) designates the content difference value over which the scene change is detected between the respective consecutive frames 302.

The graph 610 presents an exemplary scenario where three candidate scene changes 604A, 604B and 604C are detected for respective content differences (DIFF) DIFF[I+4] 602E, DIFF[I+5] 602F and DIFF[I+6] 602G which all exceed the pre-defined threshold value (TH). The candidate scene changes 604A, 604B and 604C are therefore detected between consecutive frames FRAME[I+5] and FRAME[I+6], between consecutive frames FRAME[I+5] and FRAME[I+6] and between consecutive frames FRAME[I+6] and FRAME[I+7] respectively. In order to avoid multiple adjacent scene changes between consecutive frames the heuristic function(s) may select, as the actual scene change, the candidate scene change which presents the largest content difference (DIFF) among the candidate scene changes 604A, 604B and 604C. As seen in the graph 615 the candidate scene change 604B which presents the largest content difference DIFF[I+5] 602F is selected as the local scene change 502, i.e. the local scene change 502 is designated between FRAME[I+5] and FRAME [I+6].

The graph 620 presents an exemplary scenario where two candidate scene changes 604D and 604E are detected for respective content differences (DIFF) DIFF[I+4] 602E and DIFF[I+5] 602F. Both candidate scene changes 604D and 604E exceed the pre-defined threshold value (TH) and therefore comply as valid scene changes. A pre-defined time interval 606 defines a minimal time gap, for example, 15 seconds, 30 seconds and/or 45 seconds which is allowed between consecutive scene changes. Since the candidate scene changes 604D and 604E occur within the pre-defined time interval 606 a local scene change is selected in order to avoid multiple local scene changes. The heuristic function(s) may select, as the actual scene change, the candidate scene change which presents the largest content difference (DIFF) among the candidate scene changes 604D and 604E. As seen in the graph 625 the candidate scene change 604E which presents the largest content difference DIFF[I+5] 602F is selected as the local scene change 502, i.e. the local scene change 502 is designated between FRAME[I+5] and FRAME[I+6].

The graph 630 presents an exemplary scenario where a number of candidate scene changes 604F, 604G, 604H and 604I are detected within a pre-defined extended time interval 608 for respective content differences DIFF[I+1] 602B, DIFF[I+4] 602E, DIFF[I+5] 604F and DIFF[I+8] 602I. All the candidate scene changes 604F, 604G, 604H and 604I exceed the pre-defined threshold value (TH) and therefore comply as valid scene changes. The pre-defined extended time interval 608 defines an extended time gap, for example, one minute, two minutes and/or five minutes during which a maximum number of scene changes are permitted, for example, two, three and/or four. The maximum number of scene changes which are permitted may be adapted according to a context of the content of the frames stream 250, for example, a movie, a sports event, a news article and the likes. As seen in the graph 630, the four candidate scene changes 604F, 604G, 604H and 604I occur within the pre-defined extended time interval 608. The heuristic function(s) may select one or more actual scene changes, for example, three (as dictated by the pre-defined number 608) out of the candidate scene changes 604F, 604G, 604H and 604I. The heuristic function(s) may select as the actual scene changes, the three candidate scene change which present the largest content difference (DIFF) among the candidate scene changes 604F, 604G, 604H and 604I. As seen in a graph 625 the candidate scene changes 604F, 604H and 604I which present the largest content difference DIFF[I+1] 602B, DIFF[I+5] 602F and DIFF[I+8] 602I are selected as the scene changes 502A, 502B and 502C respectively. I.e. the scene changes 502A, 502B and 502C are designated between FRAME[I+2] and FRAME[I+3], FRAME[I+5] and FRAME[I+6] and FRAME[I+8] and FRAME[I+9] respectively.

In some embodiments of the present invention one or more macro-scenes are created by grouping together two or more scenes in a frames stream such as the frames stream 250. The macro-scene(s) are detected and/or created by grouping together two or more substantially similar non-consecutive scenes which present substantially the same content together with one or more middle scenes detected in between the substantially similar non-consecutive scenes. The macro-scenes may provide additional value with respect to intelligently and/or efficiently segmenting the frames stream.

There may be scenarios, for example, a premium video content (TV programs, movies etc.) where the same scene may contain two or more different views such as, for example a camera wandering between a view of a football game and a view of a crowd watching the football game. Conceptually with respect to the event context, the scene remains the same from the start of showing the football game until the last frame of the football game and it may therefore be desirable to identify the entire football game as a single event. This naturally cannot be achieved with the currently existing methods for scene change detection which rely on visual differences between consecutive frames such as the frames 302 of the frames stream 250. However, a correlation may be identified between the two or more non-consecutive scenes which present substantially the same content by comparing the content of a last frame 302 of an earlier scene (of the two non-consecutive scenes) and a content of a first frame of a later scene (of the two non-consecutive scenes) and calculating a content difference between the two frames. The content difference, for example, a distance may be calculated by a distance function. The calculated distance may be compared to a pre-defined threshold value such as, for example, the pre-defined threshold value (TH) and in case the calculated distance does not exceed (is lower) the pre-defined threshold value, the non-consecutive scenes may be considered substantially similar. The substantially similar non-consecutive scenes together with the middle scene(s) detected in between the substantially similar non-consecutive scenes may be grouped together to create the macro-scene.

Figure 7:
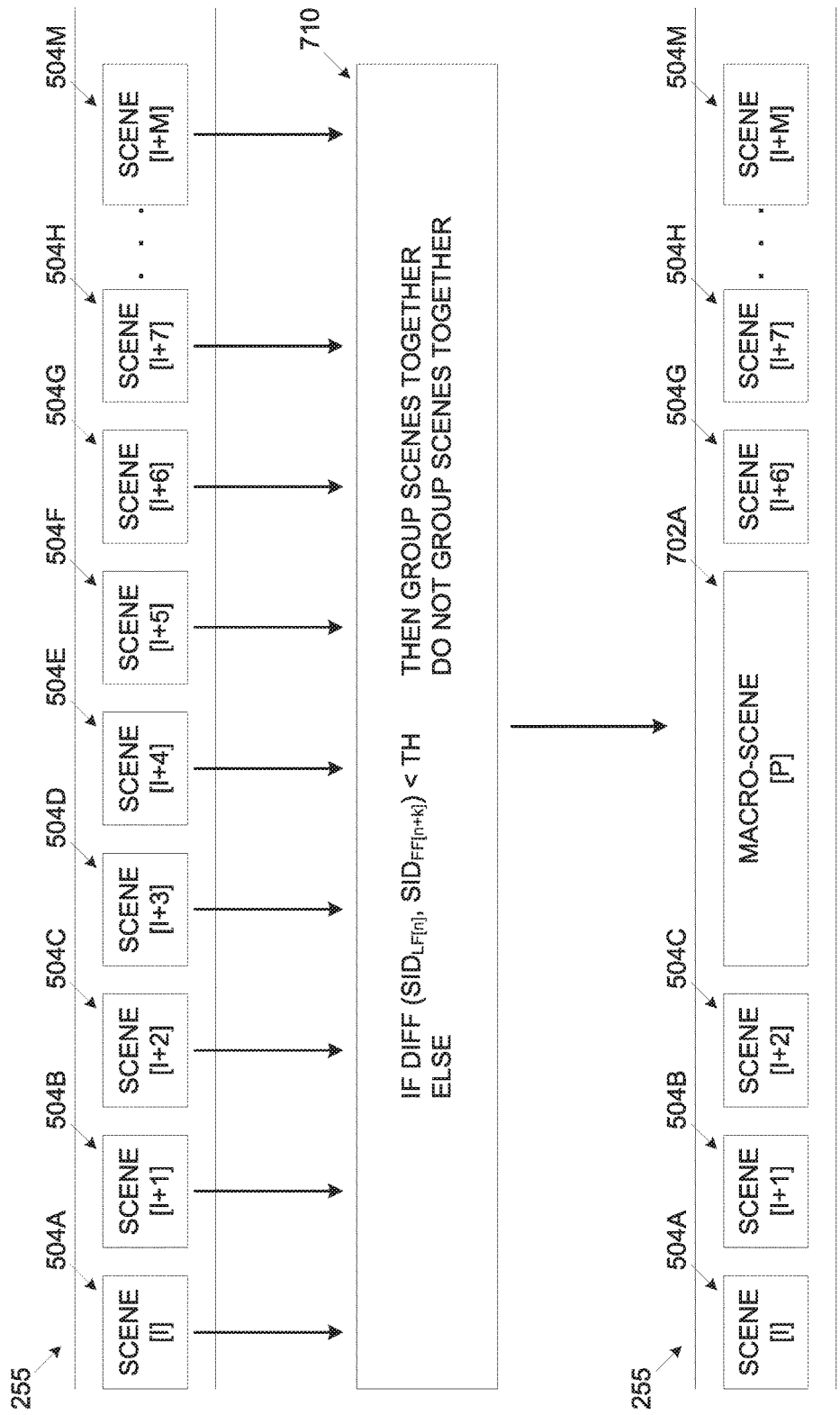
FIG. 7 is a schematic illustration of an exemplary heuristic process for detecting macro-scene(s) which comprise a plurality of context related scenes, according to some embodiments of the present invention.

Reference is now made to FIG. 7 which is a schematic illustration of an exemplary heuristic process for detecting macro-scene(s) which comprise a plurality of context related scenes, according to some embodiments of the present invention. A segmented frames stream such as the segmented frames stream 255 comprises a plurality of scenes SCENE[I] 504A through SCENE[I+M] 504M which are detected by a process such as the process 100. One or more content difference comparison functions, for example a distance function 710 calculates a distance between a content of last frame of an earlier scene and a content of a first frame of a later scene among non-consecutive scenes, for example, SCENE[I] 504A and SCENE[I+2] 504C. The calculated distance is compared to a pre-defined threshold level such as, for example, the pre-defined threshold value (TH). In case the calculated distance does not exceed TH, the non-consecutive scenes may be considered substantially similar. The first frame (FF) and the last frame (LF) may be represented by an SID record such as the SID record 304, for example an SID vector such as the SID vector 404. An SID vector 404 $SID_{LF[n]}$ is associated with the last frame of the earlier scene and an SID vector 404 $SID_{FF[n+k]}$ is associated with the first frame of the later scene. The designator k refers to the number of subsequent scenes that an earlier scene is compared to in order to identify the possible correlation between the earlier scene and one of the subsequent scenes. The designator k may be, for example, the number of different views of a camera capturing an event, for example, the football game. Naturally, each earlier scene may need to be compared for correlation with only k, for example, four subsequent scenes since later scenes (further away than k scenes) are scenes presenting content substantially similar to content presented in one of the subsequent scenes (within k scenes) or else a scene change would not be detected by the process 100. In the exemplary subset of the segmented frames stream 255, the distance function detects that the distance between the SID vector 404 $SID_{LF[I+3]}$ of the SCENE[I+3] 504D and the SID vector 404 $SID_{FF[I+5]}$ of the SCENE[I+5] 504F is below TH. The non-consecutive scenes SCENE[I+3] 504D and SCENE[I+5] 504F are therefore substantially similar presenting substantially similar content. A macro-scene MACRO-SCENE[P] 702A may be created which includes the substantially similar non-consecutive scenes SCENE[I+3] 504D and SCENE[I+5] 504F as well as the scenes detected in between SCENE[I+3] 504D and SCENE[I+5] 504F, i.e. SCENE[I+4] 504E. Similarly, additional macro-scenes may be detected along the segmented frames stream 255. Calculating the difference between the last frame of an earlier scene and a content of a first frame of a later scene among non-consecutive scenes is done the same way as is done for detecting the scene changes in the process 100. The detected substantially similar non-consecutive scenes may present the same content even if the content is somewhat transformed, for example, rotated shifted, scaled zoomed in/out and the likes. Naturally, in case the distance between the $SID_{LF[n]}$ vector of the earlier scene and the $SID_{FF[n+k]}$ vector of the later scene among the two non-consecutive scenes is above the threshold (TH) the non-consecutive scenes are not considered as substantially similar and a macro-scene is not created. For example, the distance function 710 determines that the distance between the SID vector 404 $SID_{LF[I]}$ of the SCENE[I] 504A and the SID vector 404 $SID_{FF[I+2]}$ of the SCENE[I+2] 504C is above TH. The non-consecutive scenes SCENE[I] 504A and SCENE[I+2] 504F are therefore not considered as substantially similar and the macro-scene is not created.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of detecting scene changes in a stream of frames by analyzing content differences between consecutive frames, comprising:

identifying a content of each of a plurality of frames of a frames stream by applying a plurality of visual classification functions to said each frame, said content comprises at least one of a plurality of visual elements;

determining a content difference between every two consecutive frames of said plurality of frames by comparing said content of said two consecutive frames;

detecting a scene change between said two consecutive frames when said content difference exceeds a pre-defined threshold, said scene change defines a separation between consecutive scenes of a plurality of scenes in said frames stream wherein each of said plurality of scenes comprises a subset of said plurality of frames; and generating a semantic image descriptor (SID) for each of said plurality of frames to express said content of said each frame, said semantic image descriptor is a vector comprising a plurality of visual element probability scores which are each assigned with a probability value of a respective one of said plurality of visual elements, wherein each of said plurality of visual element probability scores is calculated by an associated one of said plurality of visual classification functions to indicate a probability of existence of said respective visual element in said each frame.

2. The computer implemented method of claim 1, wherein each of said plurality of visual classification functions is a trained classification functions which is trained offline to classify said respective visual element.

3. The computer implemented method of claim 1, wherein each of said plurality of visual classification functions is a member selected from a group consisting of: a single label visual classification function and a multi-label visual classification function.

4. The computer implemented method of claim 1, further comprising detecting a scene change by calculating said content difference through comparison of respective said visual element probability values in said semantic image descriptor of two consecutive frames of said plurality of frames and designating said scene change between said two consecutive frames when a result of said comparison exceeds said pre-defined threshold.

5. The computer implemented method of claim 1, wherein said pre-defined threshold is optimized during offline training to increase positive detection and reduce false detection of said scene change in said frames stream.

6. The computer implemented method of claim 5, wherein said pre-defined threshold is optimized according to a content of said frames stream.

7. The computer implemented method of claim 1, further comprising said plurality of frames are selected frames which are extracted from said frames stream.

8. The computer implemented method of claim 1, further comprising embedding scene information in a metadata associated with said frames stream, said scene information is derived from said scene change.

9. A computer implemented method of detecting scene changes in a stream of frames by analyzing content differences between consecutive frames, comprising:

executing on a processor the steps of:

identifying a content of each of a plurality of frames of a frames stream by applying a plurality of visual classification functions to said each frame, said content comprises at least one of a plurality of visual elements;

determining a content difference between every two consecutive frames of said plurality of frames by comparing said content of said two consecutive frames;

detecting a scene change between said two consecutive frames when said content difference exceeds a pre-defined threshold, said scene change defines a separation between consecutive scenes of a plurality of scenes in said frames stream wherein each of said plurality of scenes comprises a subset of said plurality of frames; and selecting said scene change from at least two candidate scene changes identified among at least three consecutive frames of said plurality of frames, wherein said content difference for each of said at least two candidate scene changes exceeds said pre-defined threshold, said scene change is selected by identifying a selected candidate scene change having a largest content difference among said at least two candidate scene changes;

wherein each of said plurality of visual classification functions is a trained classification functions which is trained offline to classify said respective visual element.

10. A computer implemented method of detecting scene changes in a stream of frames by analyzing content differences between consecutive frames, comprising:

executing on a processor the steps of:

identifying a content of each of a plurality of frames of a frames stream by applying a plurality of visual classification functions to said each frame, said content comprises at least one of a plurality of visual elements;

determining a content difference between every two consecutive frames of said plurality of frames by comparing said content of said two consecutive frames; detecting a scene change between said two consecutive frames when said content difference exceeds a pre-defined threshold, said scene change defines a separation between consecutive scenes of a plurality of scenes in said frames stream wherein each of said plurality of scenes comprises a subset of said plurality of frames; and selecting said scene change from at least two candidate scene changes identified within a pre-define time interval, wherein said content difference calculated for each of said at least two candidate scene changes exceeds said pre-defined threshold, said scene change is selected by identifying a selected candidate scene change having a largest content difference among said at least two candidate scene changes;

wherein each of said plurality of visual classification functions is a trained classification functions which is trained offline to classify said respective visual element.

11. A computer implemented method of detecting scene changes in a stream of frames by analyzing content differences between consecutive frames, comprising:

executing on a processor the steps of:

identifying a content of each of a plurality of frames of a frames stream by applying a plurality of visual classification functions to said each frame, said content comprises at least one of a plurality of visual elements;

determining a content difference between every two consecutive frames of said plurality of frames by comparing said content of said two consecutive frames;

detecting a scene change between said two consecutive frames when said content difference exceeds a pre-defined threshold, said scene change defines a separation between consecutive scenes of a plurality of scenes in said frames stream wherein each of said plurality of scenes comprises a subset of said plurality of frames;

selecting at least two said scene changes from at least three candidate scene changes identified within an extended pre-define time interval when a number of said candidate scene changes exceeds a pre-defined number of allowed scene changes within said extended pre-define time interval, wherein said content difference calculated for each of said at least three candidate scene changes exceeds said pre-defined threshold, said at least two scene changes are selected by identifying at least two selected scene change having a largest content difference among said at least three candidate scene changes;

wherein each of said plurality of visual classification functions is a trained classification functions which is trained offline to classify said respective visual element.

12. A computer implemented method of detecting scene changes in a stream of frames by analyzing content differences between consecutive frames, comprising:

executing on a processor the steps of:

identifying a content of each of a plurality of frames of a frames stream by applying a plurality of visual classification functions to said each frame, said content comprises at least one of a plurality of visual elements;

determining a content difference between every two consecutive frames of said plurality of frames by comparing said content of said two consecutive frames; and detecting a scene change between said two consecutive frames when said content difference exceeds a pre-defined threshold, said scene change defines a separation between consecutive scenes of a plurality of scenes in said frames stream wherein each of said plurality of scenes comprises a subset of said plurality of frames;

creating at least one macro-scene by grouping together at least three scenes of said plurality of scenes, said grouping includes:

calculating said content difference between a last frame of an earlier scene among two non-consecutive scenes of said at least three scenes and a first frame of a later scene among said two non-consecutive scenes; and grouping together said two non-consecutive scenes and at least one middle scene detected in between said earlier scene and said later scene in case said content difference is lower than said pre-defined threshold;

wherein each of said plurality of visual classification functions is a trained classification functions which is trained offline to classify said respective visual element.

13. A system for detecting scene changes in a stream of frames by analyzing contents differences between consecutive frames, comprising:

an interface module for receiving a frames stream comprising a plurality of frames;

a program store storing a code; and at least one processor coupled to said interface and said program store for executing said stored code, said code comprising:

code instructions to identify a content of each of said plurality of frames by applying a plurality of visual classification functions to said each frame, said content comprises at least one of a plurality of visual elements;

code instructions to determine a content difference between every two consecutive frames of said plurality of frames by comparing said content of said two consecutive frames; and code instructions to detect a scene change between said two consecutive frames when said content difference exceeds a pre-defined threshold, said scene change defines a separation between consecutive scenes of a plurality of scenes in said frames stream wherein each of said plurality of scenes comprises a subset of said plurality of frames;

wherein said code further comprising code instructions to create at least one macro-scene by grouping together at least three scenes of said plurality of scenes, said grouping includes:

calculating said content difference between a last frame of an earlier scene among two non-consecutive scenes of said at least three scenes and a first frame of a later scene among said two non-consecutive scenes; and grouping together said two non-consecutive scenes and at least one middle scene detected in between said earlier scene and said later scene in case said content difference is lower than said pre-defined threshold;

wherein each of said plurality of visual classification functions is a trained classification functions which is trained offline to classify said respective visual element.

14. The system of claim 13, wherein each of said plurality of visual classification functions is a trained classification functions which is trained offline to classify said respective visual element.

15. The system of claim 13, wherein each of said plurality of visual classification functions is a member selected from a group consisting of: a single label visual classification function and a multi-label visual classification function.

16. The system of claim 13, wherein said code further comprising code instructions to embed scene information in a metadata associated with said frames stream, said scene information is derived from said scene change.

17. The system of claim 13, wherein said code further comprising code instruction to select said plurality of frames by extracting frames from said frames stream.

* * * * *